(12) United States Patent
Boys et al.

(10) Patent No.: US 7,474,062 B2
(45) Date of Patent: Jan. 6, 2009

(54) DECOUPLING CIRCUITS

(75) Inventors: John Talbot Boys, Auckland (NZ); Grant Anthony Covic, Auckland (NZ)

(73) Assignee: Auckland Uniservices Ltd., Auckland (NZ)

( * ) Notice: Subject to any disclaimer, the term of this patent is extended or adjusted under 35 U.S.C. 154(b) by 0 days.

(21) Appl. No.: 11/246,118

(22) Filed: Oct. 11, 2005

(65) Prior Publication Data
US 2006/0082323 A1   Apr. 20, 2006

Related U.S. Application Data

(63) Continuation of application No. PCT/NZ2004/000067, filed on Apr. 5, 2004.

(30) Foreign Application Priority Data
Apr. 9, 2003  (NZ) .................... 525219

(51) Int. Cl.
H05B 37/02  (2006.01)
(52) U.S. Cl. .............. 315/209 R; 315/224; 315/291; 315/307; 307/104

(58) Field of Classification Search .......... 315/307, 315/224, 291, 209 R; 307/104, 17, 412–415; 363/15–16, 24–25, 133
See application file for complete search history.

(56) References Cited

U.S. PATENT DOCUMENTS

| | | | |
|---|---|---|---|
| 2,851,616 A * | 9/1958 | Thompson | 307/106 |
| 4,184,197 A * | 1/1980 | Cuk et al. | 363/16 |
| 4,253,335 A * | 3/1981 | Shimomura | 73/384 |
| 6,238,387 B1 * | 5/2001 | Miller, III | 606/34 |
| 6,274,851 B1 * | 8/2001 | Mulcahy et al. | 219/501 |
| 6,294,900 B1 | 9/2001 | Greenwood et al. | |
| 6,317,338 B1 | 11/2001 | Boys | 363/25 |
| 6,483,202 B1 | 11/2002 | Boys | 307/17 |
| 6,621,183 B1 | 9/2003 | Boys | 307/145 |
| 6,661,708 B2 * | 12/2003 | Cernea et al. | 365/185.21 |
| 6,686,823 B2 | 2/2004 | Arntz et al. | 336/174 |
| 6,705,441 B1 | 3/2004 | Boys et al. | 191/10 |

FOREIGN PATENT DOCUMENTS

| | | |
|---|---|---|
| JP | 07-227003 | 8/1995 |
| JP | 2002-507110 | 3/2002 |
| JP | 2002-354711 | 12/2002 |

* cited by examiner

*Primary Examiner*—Trinh V Dinh
(74) *Attorney, Agent, or Firm*—Young & Thompson

(57) ABSTRACT

Power taken inductively from the alternating current in a track is received by a resonant circuit which is at least partially decoupled by a switching circuit asynchronously with the frequency of the power supply. The switch on and off time is controlled to regulate the output power, either the voltage or the current output being a function of the switch off time divided by the switch on time.

13 Claims, 1 Drawing Sheet

DECOUPLING CIRCUITS

TECHNICAL FIELD

This invention relates to the transfer of power by inductive power transfer from current carrying conductors, and controlling the amount of power transferred into the power receiver by decoupling the receiver from the current carrying conductors.

BACKGROUND

Inductive power transfer relies on alternating power inductively coupled from conductors and received in a power receiver by inductive transfer from those conductors. The receipt of power may be augmented by field concentrating devices and/or by tuning the power receiver to the power frequency.

This specification relates to systems in which the receiver contains a circuit which is resonant at or near the frequency of the current in the conductors. Known circuits for inductive power transfer may produce substantial reactive power flow when the tuned circuit is detuned to reduce power flow.

The Problem

The problem of unwanted reactive power flow can be almost completely overcome using what are known as "decoupling" controllers, however the choice available to designers is very restrictive. These controllers act by disconnecting the tuned circuit from the load, that is by decoupling the load from the inductive power receiving circuit. The decoupling may occur at a slower rate than the power frequency, or it may occur at a faster rate than the power frequency. In either case the average power taken from the power source is reduced. The relationship between the time coupled and the time decoupled may vary, so that the controller effectively acts to partially variably decouple the load.

If a parallel circuit topology is used for the inductive power receiver, then the maximum load current is fixed and increases in power for short transient situations can only be achieved by increasing the output voltage. Since most equipment is voltage sensitive this is unacceptable. Conversely if the power receiving circuit is a series tuned circuit it has a fixed maximum output voltage but does allow increases in power by transient surge currents. Here the average output voltage may be set by the switch duty cycle but the current may then be allowed to increase transiently as required. However these transient surges correspond to high voltages across the pick-up coil and the tuning capacitor and these may be unacceptable.

PRIOR ART

Resonant inductive power transfer is known, see for instance:

U.S. Pat. No. 4,914,539 by Turner et al. describes an inductive power transfer system for supplying power to airline seats. The specification describes a resonant power receiver which is synchronously regulated by shorting across the resonant circuit for a portion of the positive-going cycles. The construction of this circuit is such that shorting across the resonant circuit for substantially less than quarter of a cycle per cycle varies the circuit reactance. The change in circuit reactance shifts the circuit resonance and hence also reduces the available power out. However substantial reactive power flow still exists between the track conductors and the receiver and hence it should be noted that this is not decoupling of the output.

Publication WO 01/71882 describes a resonant circuit in which a synchronous switch shorts across a parallel resonant circuit for portions of leading half cycles of the power waveform. This circuit could induce dangerous conditions if the switch or the load failed in an open condition.

U.S. Pat. No. 5,293,308 describes a resonant circuit in which power flow from the track conductors to the receiver can be essentially completely decoupled. Here an asynchronous switch either shorts across a parallel resonant circuit or opens at least a portion of a series resonant circuit at any switching frequency required. In any case the power transferred to the resonant circuit can be reduced to near zero. Variation of the duty cycle of the switch can provide any required output power up to the maximum available. In the minimum power condition there is essentially no adverse reactive power flow.

Object

It is an object of the invention to provide a method of switchably decoupling a resonant receiver for inductive power transfer such that the power transferred may be controlled to accommodate a very wide range of coupling conditions, where the limitations on the maximum voltage or maximum current are reduced.

It is a further object of the invention to know the failure modes of the control circuit so that protection means may be incorporated so that the circuit will fail safely with a switch failure or with a receiver load failure. Finally it is a further object of the invention to at least provide the public with a useful choice.

STATEMENT OF INVENTION

In one aspect the invention relates to a switchable circuit for receiving power from an alternating current power supply inductively, which circuit is substantially resonant at the frequency of the received power, but which may be decoupled from the power supply by operating a switch, which switch operates cyclically at a frequency unrelated to the power supply frequency, and in which the theoretical lossless output voltage and the theoretical lossless output current are a function of the fractional time the switch is on divided by the fractional time the switch is off.

Preferably one of the output voltage or the output current is an inverse function of the fractional time on divided by the fractional time off.

Preferably the observed Q of the circuit can in operation be reduced to zero by appropriate choice of the fractional time the switch is on.

Preferably the switchable circuit utilises a full wave rectifier and a unidirectional switching component.

Preferably the circuit utilises a pickup coil inductively coupled to the current source and wherein a series resonant circuit is used for the pickup coil.

Preferably the circuit utilises a pickup coil inductively coupled to the current source and wherein a parallel resonant circuit is used for the pickup coil.

Preferably the switchable circuit uses a buck-boost configuration on the output side of the circuit.

Preferably the switch is a serially disposed switch.

Preferably the switchable circuit uses a Cuk configuration on the output side of the circuit.

Preferably the switch is a parallel disposed switch.

Preferably the switch is continually switched at a frequency higher than the power supply frequency and unrelated to the power supply frequency with a variable on/off time to regulate the output voltage or current.

Alternatively the switch is continually switched at a frequency lower than the power supply frequency with a variable on/off time to regulate the output voltage and current.

Preferably the output voltage can be higher or lower than the voltage induced in the pickup coil.

Preferably the failure mode due to the failure of a single component is identifiable and the circuit will not self destruct in the event of such a failure.

Preferably the maximum circuit current is limited by a saturable reactor in series.

In another aspect the invention relates to a method of controlling a switchable circuit for receiving power inductively from an alternating current power supply where the receiving circuit is substantially resonant at the power supply operating frequency and the switch operates cyclically to substantially decouple the receiving circuit from the power supply and the switch is cyclically closed at a frequency unrelated to the power supply frequency and the theoretical lossless output current and the theoretical lossless output voltage are functions of the time per cycle the switch is on divided by the time per cycle the switch is off wherein the cyclical time the switch is closed is regulated to maintain either the required output current or output voltage.

DESCRIPTION OF DRAWINGS

These and other aspects of this invention, which would be considered as novel in all aspects will become apparent from the following description, which is given by way of example. With reference to the accompanying partial drawings a potential receiver circuit comprises either FIG. 1 or FIG. 2 as the resonant part of the complete receiver, and any one of FIGS. 3, 4, 5 or 6 as the control part. In this way eight potential receivers are possible and are listed in table 1. The figures are:

FIG. 1+3 represents a circuit for a known prior art receiver decoupling

FIG. 1+4 represents a circuit for a theoretical receiver which cannot decouple

FIG. 1+5 represents a new circuit according to the present invention

FIG. 1+6 represents a new circuit according to the present invention

FIG. 2+3 represents a circuit for a potential receiver which cannot decouple

FIG. 2+4 represents a circuit for a known receiver decoupling switch

FIG. 2+5 represents a new circuit according to the present invention

FIG. 2+6 represents a new circuit according to the present invention

With reference to FIG. 1 there is shown the input to a receiver circuit using a parallel resonant circuit of capacitor 13 and a pickup coil comprising inductor 12 receiving power from source 11 whose output is full wave rectified at 14.

FIG. 2 shows the input to a receiver circuit using a series tuned resonant circuit of capacitor 23 and a pickup coil comprising inductor 22 with a full wave rectifier 24. Rectifier 24 is shunted by smoothing capacitor 25.

When FIG. 3 is connected to the output of FIG. 1 a known receiver circuit is produced, whose output from full wave rectifier 14 is applied via a boost inductor 31 to a load circuit of resistor 35 and smoothing capacitor 34 via rectifier 33. An asynchronous switch 32 can short across the load, acting to essentially completely decouple the receiver from the power supply. In such a condition the circuit will receive very little power from the supply.

When FIG. 4 is connected to the output of FIG. 1 a parallel resonant receiver with a buck controller is created which is not practical for decoupling.

When FIG. 5 is connected to the output of FIG. 1 a parallel resonant receiver with a buck-boost control circuit is created. Here the output from rectifier 14 is supplied to load circuit 54 and 55 via buck boost inductor 52 and asynchronous switch 51 and rectifier 53. Switch 51 will provide decoupling when closed.

When FIG. 6 is connected to the output of FIG. 1 a parallel resonant receiver with a Cuk control circuit is created. Here the output from rectifier 14 is supplied to load circuit 65, 66 and 67 via Cuk inductor 61, asynchronous switch 62, capacitor 63 and rectifier 64. Switch 62 will provide decoupling when closed.

When FIG. 3 is connected to the output of FIG. 2, the DC output of the series tuned resonant circuit across smoothing capacitor 25 is connected via boost inductor 31 to a load circuit of resistor 35 and smoothing capacitor 34 via rectifier 33. Providing asynchronous switch 33 is switched at a frequency well above the power supply frequency it will act to control power flow to the load, such that when switch 33 is on, no power is transferred to the load and vice versa. With this switch off the output voltage on this circuit will eventually settle but power flow cannot be controlled. This circuit cannot be decoupled from the power supply.

When FIG. 4 is connected to the output of FIG. 2 a known receiver circuit is produced whose output from full wave rectifier 24 and smoothing DC capacitor 25 is applied to a load circuit generally of capacitor 44 and resistor 45 via buck inductor 43 and rectifier 42. Asynchronous switch 41 acts to alter the transfer of power. If switch 41 is open no power is transferred to the load and vice versa. Rectifier 42 enables continuous current flow in buck inductor 43 when switch 41 is open. Furthermore, when switch 41 is open this essentially completely decouples the receiver from the power supply. In such a condition the circuit will receive very little power from the supply.

When FIG. 5 is connected to the output of FIG. 2 a series resonant receiver with a buck-boost control circuit is produced. Switch 51 feeds the load circuit comprising capacitor 54 and resistor 55 via buck boost inductor 52 and rectifier 53. Opening the switch prevents power flow to the resonant circuit and provides decoupling, while also preventing power flow on the secondary side to the load.

When FIG. 6 is connected to the output of FIG. 2 a series resonant receiver with a Cuk control circuit is produced. A secondary inductor 61 acts to supply a load circuit comprising inductor 65, capacitor 66 and resistor 67 via asynchronous switch 62, Cuk capacitor 63 and rectifier 64. Operation of the switch is effective in providing decoupling.

TABLE 1

Figure 1:
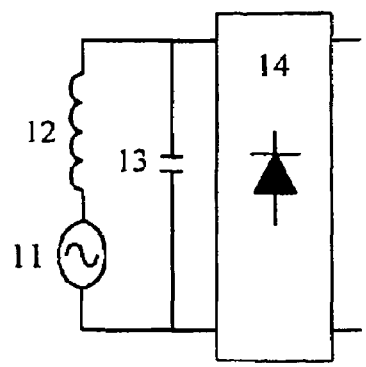
FIG. 1 shows a parallel resonant receiver without control

| Figure | Tuning | Controlled Decoupling Ability | Theoretical Output Current ($I_o$) | Theoretical Output Voltage ($V_o$) | Observed Q | Theoretical Output Power |
|---|---|---|---|---|---|---|
| 1 + 3 | Parallel | Yes | $\frac{\pi}{2\sqrt{2}} \frac{IM}{L}(1-D)$ | $\frac{2\sqrt{2}}{\pi}\omega MIQ \frac{1}{(1-D)}$ | $\frac{\pi}{2\sqrt{2}} \frac{V_o}{\omega MI}(1-D)$ | $\omega I^2 \frac{M^2}{L} Q$ |
| 1 + 4 | Parallel | No | $\frac{\pi}{2\sqrt{2}} \frac{IM}{L} \frac{1}{D}$ | $\frac{2\sqrt{2}}{\pi}\omega MIQD$ | $\frac{\pi}{2\sqrt{2}} \frac{V_o}{\omega MI} \frac{1}{D}$ | $\omega I^2 \frac{M^2}{L} Q$ |
| 1 + 5 | Parallel | Yes | $\frac{\pi}{2\sqrt{2}} \frac{IM}{L} \frac{(1-D)}{D}$ | $\frac{2\sqrt{2}}{\pi}\omega MIQ \frac{D}{(1-D)}$ | $\frac{\pi}{2\sqrt{2}} \frac{V_o}{\omega MI} \frac{(1-D)}{D}$ | $\omega I^2 \frac{M^2}{L} Q$ |
| 1 + 6 | Parallel | Yes | $\frac{\pi}{2\sqrt{2}} \frac{IM}{L} \frac{(1-D)}{D}$ | $\frac{2\sqrt{2}}{\pi}\omega MIQ \frac{D}{(1-D)}$ | $\frac{\pi}{2\sqrt{2}} \frac{V_o}{\omega MI} \frac{(1-D)}{D}$ | $\omega I^2 \frac{M^2}{L} Q$ |
| 2 + 3 | Series | No | $\frac{2\sqrt{2}}{\pi} \frac{IM}{L} Q(1-D)$ | $\frac{\pi}{2\sqrt{2}}\omega MI \frac{1}{(1-D)}$ | $\frac{\pi}{2\sqrt{2}} \frac{LI_o}{MI} \frac{1}{(1-D)}$ | $\omega I^2 \frac{M^2}{L} Q$ |
| 2 + 4 | Series | Yes | $\frac{2\sqrt{2}}{\pi} \frac{IM}{L} Q \frac{1}{D}$ | $\frac{\pi}{2\sqrt{2}}\omega MID$ | $\frac{\pi}{2\sqrt{2}} \frac{LI_o}{MI} D$ | $\omega I^2 \frac{M^2}{L} Q$ |
| 2 + 5 | Series | Yes | $\frac{2\sqrt{2}}{\pi} \frac{IM}{L} Q \frac{(1-D)}{D}$ | $\frac{\pi}{2\sqrt{2}}\omega MI \frac{D}{(1-D)}$ | $\frac{\pi}{2\sqrt{2}} \frac{LI_o}{MI} \frac{D}{(1-D)}$ | $\omega I^2 \frac{M^2}{L} Q$ |
| 2 + 6 | Series | Yes | $\frac{2\sqrt{2}}{\pi} \frac{IM}{L} Q \frac{(1-D)}{D}$ | $\frac{\pi}{2\sqrt{2}}\omega MI \frac{D}{(1-D)}$ | $\frac{\pi}{2\sqrt{2}} \frac{LI_o}{MI} \frac{D}{(1-D)}$ | $\omega I^2 \frac{M^2}{L} Q$ |

The performance of all of these circuits can be compared in terms of their theoretical output voltage and theoretical output current, and a complete set of results is given in table 1. Here I is the track current, M is the mutual inductance between the track and the receiver coil, L is the inductance of the receiver coil, D is the fractional time that the switch in each circuit (namely 32, 41, 51, 62) is on for, ω is the track frequency, Vo is the output voltage and Io is the output current. The only control variable is D, while the theoretical maximum output power varies with the design Q of the circuit (the receiver coil quality factor). Here we introduce a new observation, the observed Q (which is defined as what an observer would actually see while the circuit was operating) which is a measure of the average resonance occurring in the resonant circuit under the particular operating conditions, and is listed in table 1. If the observed Q can be reduced to essentially zero by varying D, then the circuit can be essentially completely decoupled. Thus all circuits except those created using FIGS. 1+4 and FIG. 2+3 can be essentially completely decoupled.

Partially Controllable Decoupling Circuits

Control circuit 3 when associated with the series circuit 2 cannot be completely decoupled, that is, when the switch is open power will still be supplied to the output, however the circuit has the advantage that within a short period the series capacitor will charge, preventing further output and thus effectively decoupling the output. It is thus suitable for safe switching at frequencies lower than the supply frequency, though it will operate at switching frequencies above the supply frequency.

Controllable Decoupling Circuits

Figure 4:
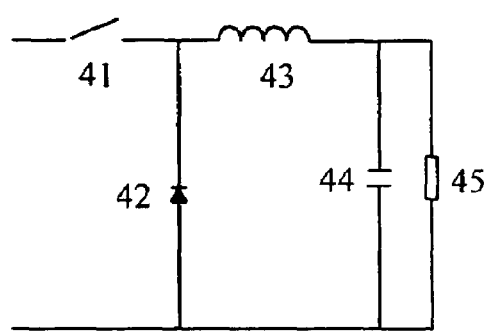
FIG. 4 shows a control circuit in buck configuration
Figure 5:
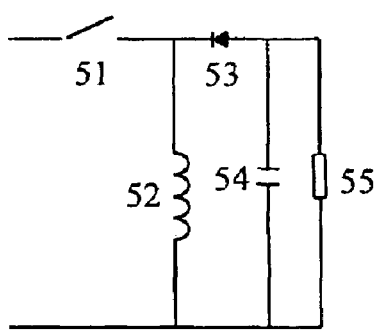
FIG. 5 shows a control circuit in buck-boost configuration
Figure 6:
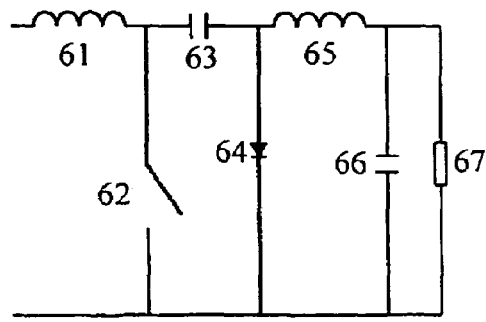
FIG. 6 shows a control circuit in so called Cuk configuration The eight potential receivers are constructed by pairs of figures as described below. The first figure relates to the resonant input of the receiver and the second figure relates to the type of controller.

Control circuits FIGS. 5 and 6 can be essentially completely decoupled with either a series or parallel tuned resonant circuit, making them unique in application to an inductive switching circuit. These results are completely unexpected. For example the buck-boost circuit of FIG. 5 looks similar to the configuration of FIG. 4 for series resonant input given by FIG. 2 and would be expected to operate with a series tuned circuit however it would not be expected to operate with the parallel resonant circuit of FIG. 1, but it does. These new circuits of FIGS. 5 and 6 must be operated with fast switching controllers, whereas known receivers FIGS. 1+3 and FIGS. 2+4 can be controlled either using fast or slow switching.

In the usual operation of a parallel tuned circuit (FIGS. 1+3) the output current is fixed and the input voltage can be increased in direct proportion to the maximum allowable Q of the tuned circuit. Similarly with circuit FIG. 2+4 the maximum output voltage is nominally fixed, but the current can be increased depending on the allowable Q of the resonant circuit. In practice however, these ideals are difficult to meet, since the mutual inductance between the pick-up coil and the current carrying conductors vary from time to time, so that with FIG. 1+3 the output current must be greater than the current ever required under worst case conditions, and similarly for the output voltage of FIG. 2+4. In practice therefore the circuits always operate under non ideal conditions.

In the series resonant mode the output voltage of both circuits FIGS. 5 & 6 can have their output voltages advantageously controlled above or below the voltage induced in the pick-up coil, while the power flow is dependent on current and the observed Q of the receiver. Thus large variations in M can be compensated for. This is a unique feature allowing a wide range of operating conditions. Similarly in the parallel resonant mode the output current of both FIGS. 5 and 6 can be advantageously controlled above or below some nominal design point within the resonant receiver to enable a constant output current to be achieved irrespective of large variations in M as might be required for constant current battery charging. Here the power flow is dependent on the voltage and the observed Q of the receiver. These advantageous features can best be described by example, as discussed following.

TABLE 2

Receivers designed for 900 W power and 300 VDC output

| Figures | Induced Voltage ωMI | Short-Circuit Current MI/L | Observed Q; D @ Rated Power | Observed Q; D @ Max Power and 300 V | Maximum achievable Power Output @300 V | Observed Q; D @ 150% Rated Power |
|---|---|---|---|---|---|---|
| 1 + 3 | 40 V | 3 A | 7.5; 0.1 | 8.33; 0 | 1 kW | Not possible |
| 2 + 4 | 360 V | 0.333 A | 7.5; 0.75 | ∞; 0.75 | ∞(but limited by practical Q) | 11.25; 0.75 |
| 2 + 5 | 360 V | 0.333 A | 7.5; 0.429 | ∞; 0.429 | ∞(but limited by practical Q) | 11.25; 0.429 |
| 2 + 5 | 90 V | 1.33 A | 7.5; 0.75 | ∞; 0.75 | ∞(but limited by practical Q) | 11.25; 0.75 |

TABLE 3

Receivers designed for 900 W power and 300 VDC output with M = 70%

| Figures | Induced Voltage ωMI | Short-Circuit Current MI/L | Observed Q; D | Output Voltage (V) | Output Power (W) |
|---|---|---|---|---|---|
| 1 + 3 | 28 V | 2.1 | 11.9; 0 | 300 | 700 (Max) |
| 2 + 4 | 252 V | 0.233 | 15.3; 1 | 280 (Max) | 900 |
| 2 + 5 | 252 V | 0.233 | 15.3; 0.517 | 300 | 900 |
| 2 + 5 | 63 V | 0.931 | 15.3; 0.82 | 300 | 900 |

TABLE 4

Receivers designed for 900 W power and 300 VDC output with M = 50%

| Figures | Induced Voltage ωMI | Short-Circuit Current MI/L | Observed Q; D | Output Voltage (V) | Output Power (W) |
|---|---|---|---|---|---|
| 1 + 3 | 20 V | 1.5 | 16.66; 0 | 300 | 500 (Max) |
| 2 + 4 | 180 V | 0.167 | 29.9; 1 | 200 (Max) | 900 |
| 2 + 5 | 180 V | 0.167 | 29.9; 0.6 | 300 | 900 |
| 2 + 5 | 45 V | 0.665 | 29.9; 0.857 | 300 | 900 |

Figure 2:
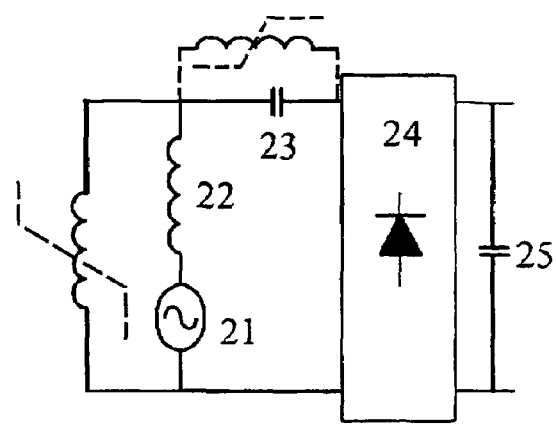
FIG. 2 shows a series resonant receiver without control
Figure 3:
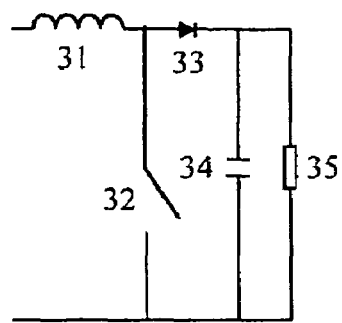
FIG. 3 shows a control circuit in boost configuration

In Table 2 known prior art receivers of FIGS. 1+3 and FIGS. 2+4 are compared with two possible designs for one of the new receivers (FIG. 2+5) to demonstrate the useful properties of this new receiver. Each receiver is assumed to have been designed for an expected output of 900W at 300V DC and for a design Q of 7.5.

Under normal operation, the nominal induced voltage, short-circuit current, and operating D are shown for each receiver. The table shows that in the case where output voltage control is desired, known receiver FIG. 1+3 is power limited, whereas receivers with series tuned resonant inputs are constrained only by the practical observed Q. Observed Q's of 1-10 are typical of values that might be used in practice. Values of Q up to 20 may be possible in some cases, and while larger values are unlikely to be used as components are unlikely to be accurate enough, they may be possible providing additional means, by which the system can be held in a tuned condition, are introduced.

Table 3 and 4 show the effect on each of the receivers' power capability and voltage when the mutual coupling between the receiver and the current carrying conductors is reduced (as might happen if the receiver was not mechanically aligned with the current carrying conductors). Notably, only the new receiver of FIG. 2+5 (or 2+6) is theoretically capable of delivering both the required output voltage and the power delivery under the conditions shown, although in practice the power delivery may well be constrained by the practical Q. FIG. 1+3 becomes severely power limited with reducing M, while FIG. 2+4 is unable to provide the necessary voltage output.

Technical Advantages of the Circuits.

The traditional receiver used for IPT applications is FIG. 1+3 and as shown in the table it will achieve the design figures for an observed Q of 7.5, however in most circumstances where the load is voltage sensitive a power surge of any description at all is impossible—momentary overloads simply cannot be met. Further, if the receiver becomes misaligned with respect to the current carrying conductors such that the mutual inductance is reduced by 30% (table 3) then as shown the maximum output power is reduced by 30%.

Using existing knowledge, FIG. 2+4 can improve on these figures. Here the regular load can be met. A power surge of 50% can be met by allowing the observed Q to increase but the misalignment problem cannot be compensated for while retaining the required output voltage. The surge voltage and the reduced M both cause very high voltages across the resonant components.

With the newer circuits of FIGS. 5 and 6, the same receiver design as for 2+4 can also be used. In these circumstances, the surge can be met, the reduced value in M can be met, but the resonant voltages are again very high. The observed Q values in these circumstances are identical to those of FIG. 2+4.

Advantageously however, with the new invention a completely different receiver design can be used (as shown in tables 2, 3, and 4). In this circumstance the design has been selected to have the same switch duty cycle as FIG. 2+4 of 0.75. As shown both the nominal short-circuit current and induced voltage of this receiver are quite different. This receiver can accommodate a 150% surge and a misalignment drop in M of 30% without producing excessively high voltages on the resonant components. In all cases the resonant voltages (equal to ωMIQ) are less than 1 kV. This figure compares with FIG. 2+4 where a resonant voltage of approximately 4 kV is required to produce the 150% surge in power output.

In the last example discussed above, the output DC voltage of FIG. 2+5 is much higher than the induced voltage in the receiver coil. However in other circumstances it is easy to have a very high resonant voltage producing a low output voltage so that the switch can be switching lower currents.

The above advantages shown for FIG. 2+5 can also be shown to be true for FIG. 2+6. For battery charging outputs the circuits of FIG. 1+5 and FIG. 1+6 can be used giving a controlled output current with similar advantages over known receivers FIG. 1+3 and FIG. 2+4 as discussed above for a desired voltage controlled output.

Variations

An ideal method of control for all IPT circuits is decoupling where, regardless of the status of the load over the range from short circuit to open circuit, the switch can always be operated to decouple the receiver circuit such that no power is transferred from the current carrying conductors to the receiver coil. Provided the switch remains functional this ideal condition is always meet. However for circuits where decoupling is not possible and/or circuits where the switch has failed, protection may be achieved by placing a saturable inductor across the pick-up coil or its tuning capacitor. As potentially dangerous resonance occurs the saturable inductor detunes the receiver coil and reduces the real power flow from the current carrying conductors. Decoupling is not achieved as considerable reactive power flow still occurs but the risks of explosion or fire are much reduced.

INDUSTRIAL APPLICABILITY

The invention is industrially applicable to the electric powering of mobile vehicles, to the powering of devices separated from the power source because of some required isolation, and to the control of the power supplied to the separated device.

The invention claimed is:

1. A switchable circuit for receiving power from an alternating current power supply by inductive power transfer, said circuit is substantially resonant at the frequency of the received power, but is substantially decouplable from the power supply by operating a switch, said switch operates cyclically at a frequency unrelated to the power supply frequency, wherein a theoretical output voltage and a theoretical output current are functions of the fractional time the switch is on divided by the fractional time the switch is off whereby either the output current or output voltage is controllable in a range at least one of above and below that induced in the circuit, and the quality factor of the circuit being reducible to zero by appropriate choice of the fractional time the switch is on, wherein the quality factor in the circuit is defined as a ratio of power stored in the circuit reactance versus power dissipated in the circuit.

2. A switchable circuit as claimed in claim 1 wherein one of the output voltage or the output current is an inverse function of the fractional time on divided by the fractional time off.

3. A switchable circuit as claimed in claim 1 wherein the switchable circuit utilises a full wave rectifier and a unidirectional switching component.

4. A circuit as claimed in claim 1 wherein the switchable circuit uses a buck-boost configuration on the output side of the circuit.

5. A switchable circuit as claimed in claim 4 wherein the circuit utilises a series resonant circuit inductively coupled to the current power supply.

6. A switchable circuit as claimed in claim 4 wherein the circuit utilises a parallel resonant circuit inductively coupled to the current power supply.

7. A circuit as claimed in claim 1 wherein the switchable circuit uses a Cuk configuration on the output side of the circuit.

8. The switchable circuit as claimed in claim 7, wherein the circuit utilizes a series resonant circuit inductively coupled to the current power supply.

9. The switchable circuit as claimed in claim 7, wherein the circuit utilizes a parallel resonant circuit inductively coupled to the current power supply.

10. A switchable circuit as claimed in claim 1 wherein the switch is continually switched at a frequency higher than the power supply frequency and unrelated to the power supply frequency with a variable on/off time to regulate the output voltage or current.

11. A switchable circuit as claimed in claim 1 wherein the switch is continually switched at a frequency lower than the power supply frequency with a variable on/off time to regulate the output voltage and current.

12. A switchable circuit as claimed in claim 1 wherein a failure mode due to the failure of a single component is identifiable and the circuit will not self destruct in the event of such a failure.

13. A switchable circuit as claimed in claim 1 wherein the switchable circuit uses a pickup coil inductively coupled to the power supply, and a tuning capacitor associated with the pickup coil such that the circuit is substantially resonant at the frequency of the received power, and wherein a saturable inductor is provided in parallel with the pickup coil or with the tuning capacitor to limit the current in the circuit.

* * * * *